Aug. 27, 1929.  E. P. HAYES  1,726,436
GASOLINE DISPENSING APPARATUS
Filed Jan. 16, 1923   5 Sheets-Sheet 3

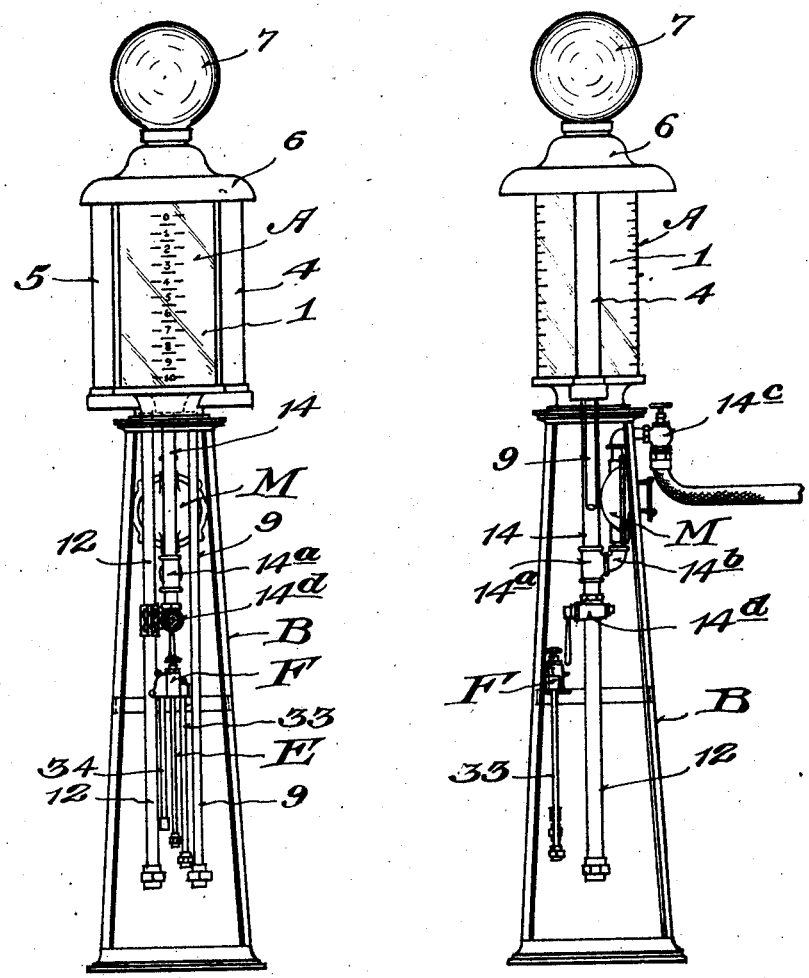

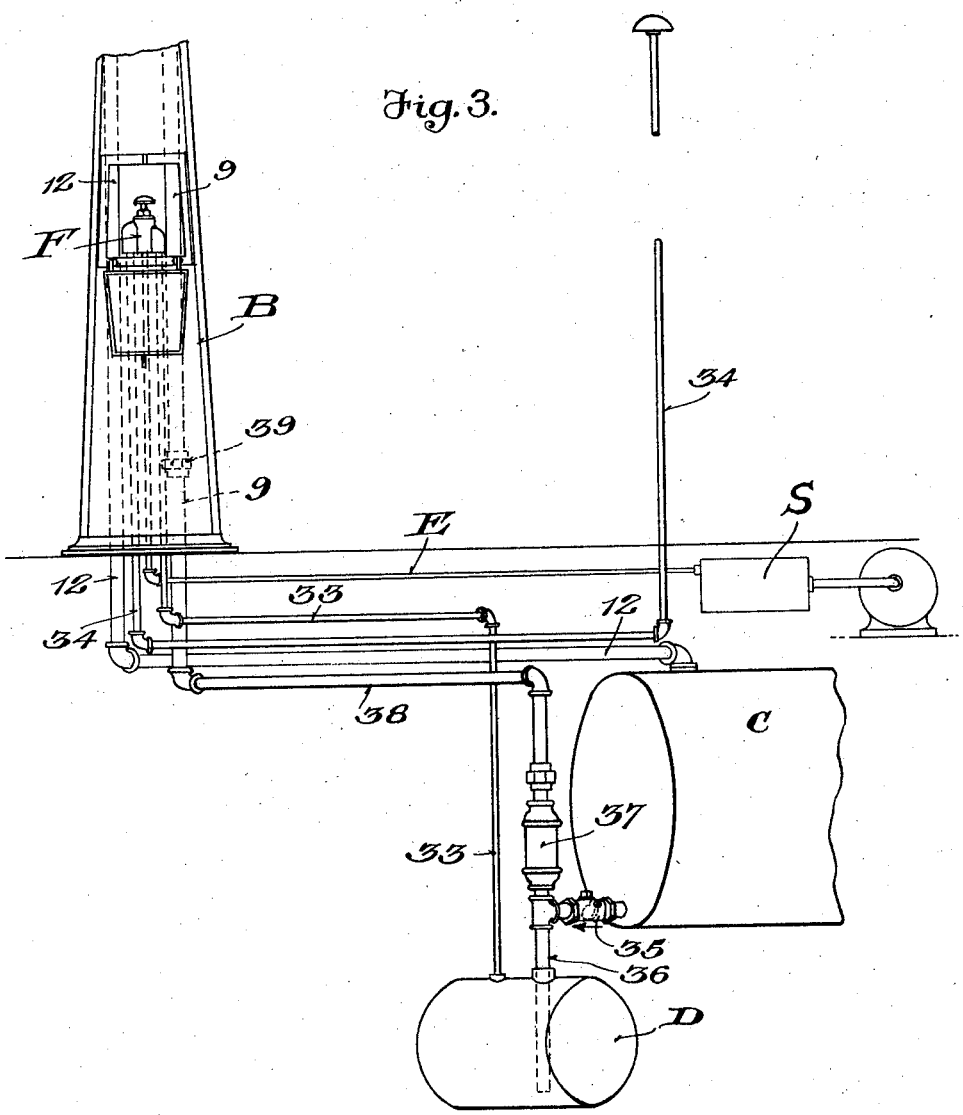

Edmond P. Hayes, INVENTOR.

BY E. H. Colladay, ATTORNEY.

Aug. 27, 1929.    E. P. HAYES    1,726,436
GASOLINE DISPENSING APPARATUS
Filed Jan. 16, 1923    5 Sheets-Sheet 4

Edmond P. Hayes,
INVENTOR.

BY
E. H. Colladay
ATTORNEY.

Aug. 27, 1929.  E. P. HAYES  1,726,436
GASOLINE DISPENSING APPARATUS
Filed Jan. 16, 1923  5 Sheets-Sheet 5

Edmond P. Hayes INVENTOR.

BY
E. H. Colladay
ATTORNEY.

Patented Aug. 27, 1929.

1,726,436

UNITED STATES PATENT OFFICE.

EDMOND P. HAYES, OF WICHITA, KANSAS.

GASOLINE-DISPENSING APPARATUS.

Application filed January 16, 1923. Serial No. 613,029.

This invention relates to apparatus of the type adapted to dispense measured quantities of a liquid, such for example as gasoline or the like.

One of the objects of the invention is to provide an apparatus including a visible dispensing container, or measure whereby the customer may view the fuel purchased and which container is so constructed and arranged that fuel therein will not leak back to the supply tank, thereby preventing short measure to the customer. In that connection the invention contemplates a novel arrangement of inlet and overflow connections which may be arranged outside of the container or tank thereby permitting of a wide range of construction and design in this portion of the apparatus.

Another object of the invention is to provide a valved filler pipe for the dispensing container.

A further object of the invention is to provide novel means for forcing the fuel from the underground storage tank to the dispensing container, the same including a single valve for controlling the supply and release of the compressed air which is used as the lifting medium for the fuel.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:—

Figure 1 is a front elevation of the apparatus located above the ground.

Figure 2 is a side elevation of the apparatus shown in Figure 1.

Figure 3 is a detail view illustrating the underground portion of the apparatus and the piping connections leading to the construction shown in Figures 1 and 2.

Similar reference characters designate corresponding parts throughout the several figures of the drawings.

As previously indicated the present apparatus is particularly designed with a view to exhibiting a measured quantity of fuel to be sold and to that end it preferably includes in its organization a transparent dispensing container unit A mounted upon a suitable support or stand B and supplied with fuel from a main storage tank C and auxiliary tank D through suitable piping connections to be presently described in detail. In that connection the apparatus utilizes compressed air generated in the conventional manner and conveyed by the supply line E to a manually manipulated valve F having a single control handle which permits of the operator readily to control the elevation of fuel from the main and auxiliary storage tanks to the dispensing container and then release the air pressure in the auxiliary tank and piping connections.

Figure 4:
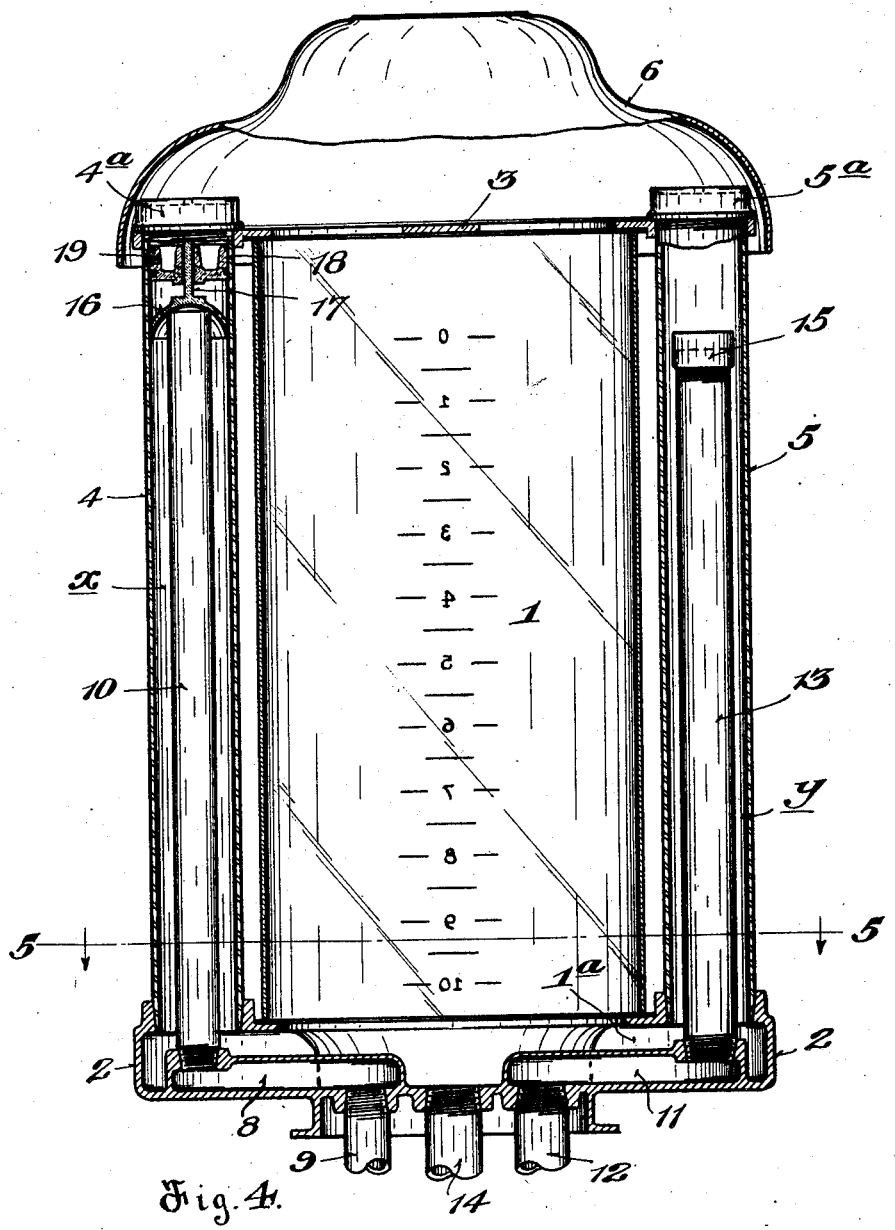
Figure 4 is a vertical sectional view, looking from the rear, of the dispensing container.
Figure 5:
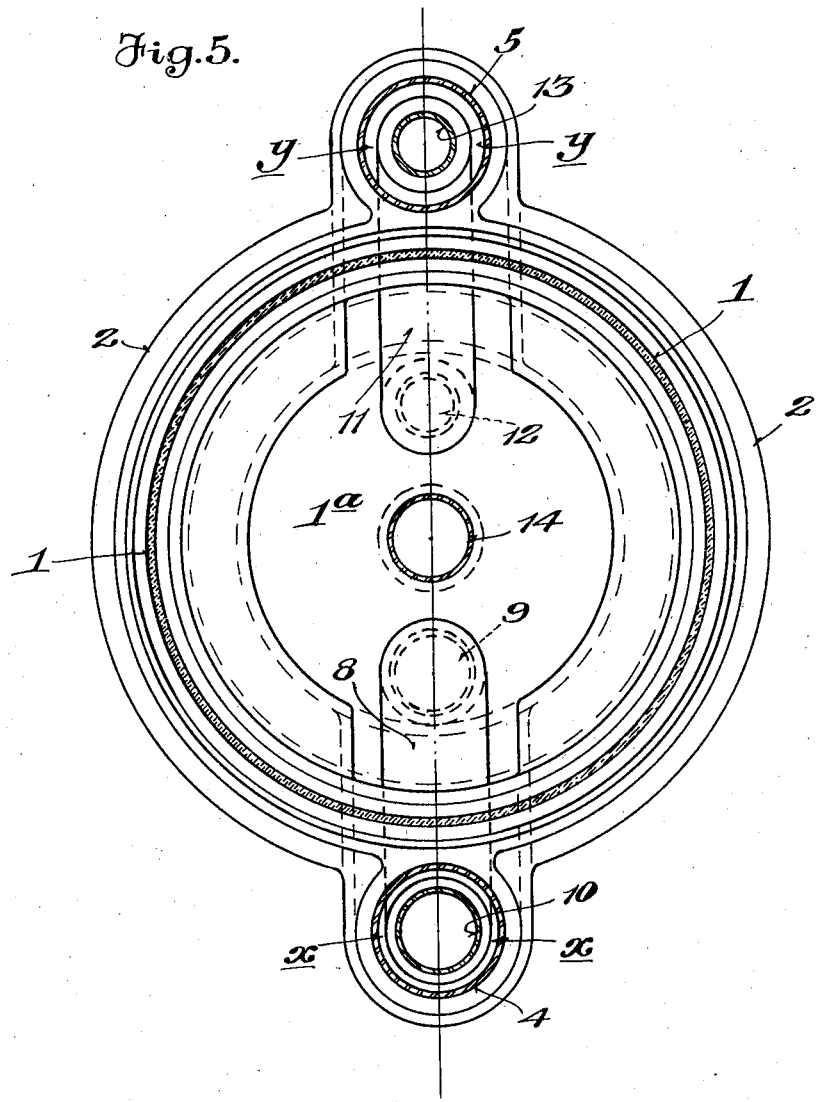
Figure 5 is a horizontal sectional view taken on the line 5—5 of Figure 4.
Figure 6:
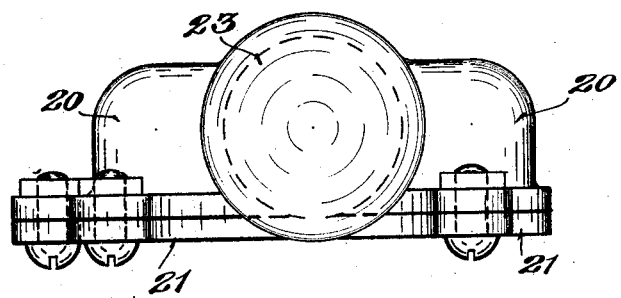
Figure 6 is a top plan view of the single manually controlled valve for manipulating the air circuits of the apparatus.

Referring first to the dispensing container A it will be observed that the same preferably consists of a glass or other transparent cylinder 1, the same being suitably calibrated to indicate the contents of the container in gallons. The said cylinder 1 is supported at its lower end upon a base member designated generally as 2 and is engaged at its upper end by a spider plate 3 whereby the ends of the container may be securely clamped between the base 2 and the spider 3 by the tubular members or hollow standards 4 and 5 by the cap nuts 4$^a$ and 5$^a$ as shown in Figure 4 of the drawings. These cap nuts are preferably ported to provide vent openings thereby preventing a siphoning action in the tubes or standards.

The top of the cylinder is preferably protected by a suitable cap 6 surmounted by a globe 7 which may be illuminated to provide lighting facilities at night. It will of course be understood that where the ends of the cylinder 1 connect with the base 2 suitable sealing means or a gasket is used to provide a liquid tight connection.

The cylinder 1 and hollow standards 4 and 5 in combination with the novel base member 2 constitute one of the important and distinctive features of the present invention. That is to say, the tubular members 4 and 5 provide inlet and outlet chambers $x$ and $y$ which are in open communication with the container 1 through the base 2, thereby providing in effect a plurality of communicating chambers, one of which acts as a temporary storage compartment for the increment of liquid to be dispensed while others function as inlet and overflow chambers. Obviously, these chambers may be assembled in the relation shown in the drawings, or they may be widely separated so long as they communicate to permit of the handling of the liquid in the manner referred to.

The base member 2 is preferably formed with the passage-way 8 which communicates with a fuel supply pipe 9 at one end and at the other end with a fuel pipe 10 which extends upwardly into the chamber $x$ of the hollow standard 4. Another portion of the base 2 is provided with a passage 11 which communicates with a return drain pipe 12 and also with the vertically disposed overflow pipe 13 arranged within the chamber $y$ of the hollow standard 5.

As will be observed from Figure 4 of the drawings the fill pipe 10 and the overflow pipe 13 are both of less diameter than the hollow standards 4 and 5 thereby permitting free passage of fuel between the pipes and the standards which are in open communication with the chamber $1^a$ of the base 2 and which latter chamber is in open communication with the interior of the transparent cylinder 1. As will also be seen from Figure 4 of the drawings the chamber $1^a$ is provided with a customer's discharge line 14 which will hereinafter be more fully referred to.

In connection with the overflow pipe 13 it will be observed that the latter is provided with an adjustable collar 15 which permits of varying the height of the overflow column to a point precisely in line with the "zero" mark on the glass cylinder.

Also it will be observed that the fill pipe 10 is provided at its upper end with a novel valve device which includes an umbrella shaped deflector valve member 16 having a stem portion 17 guided in a plug 18 secured as at 19 to the upper end of the hollow standard 4. The boss $17^a$ surrounding the stem 17 is machined and when the valve is lifted, abuts against the machined surface of the boss $18^a$ to provide a seal to prevent escape of gasoline when the valve is raised. When the valve drops onto the end of pipe 10 there is sufficient space between the stem and the guide to establish communication between the atmosphere and the chamber $x$ through the vented cap $4^a$. This valve 16 normally covers the discharge end of the fill pipe 10 and when the gasoline is forced through the pipe under pressure the valve is unseated and the liquid fuel deflected and directed downwardly into the chamber $x$ from whence it makes its way into the chamber $1^a$ and rises in the dispensing container 1. Since the chamber $y$ of the hollow standard 5 is in open communication with the chamber $1^a$ it will be apparent that the liquid will rise in the hollow standard to the same level as it does in the tank 1 until the upper edge of the overflow collar 15 is reached whereupon liquid in excess of the set capacity of the container 1 will make its way into the overflow pipe 13, passage-way 11 and return conduit 12.

The hollow standards 4 and 5 are preferably metal pipes and conceal the inflow and outflow of liquid from the container 1, and furthermore by reason of their separation and the manner in which the fuel is discharged into and removed from the same the body of liquid within the container 1 remains in a comparatively quiescent state and readily seeks an accurate level.

When it is desired to deliver the contents of the container 1 to the customer the same is removed through the discharge line 14 which includes a T-fitting $14^a$, one branch of which $14^b$ leads to a suitable liquid meter M through which the fuel passes before it makes its exit through the globe valve $14^c$ to which is attached the flexible hose or purchaser's delivery tube.

If the contents of the container 1 are to be emptied without using the customer's discharge line, this may be accomplished by manipulating the valve $14^d$ which establishes communication between the pipe line 14 and the drain connection 12 which leads back to the main storage tank C.

Figure 7:
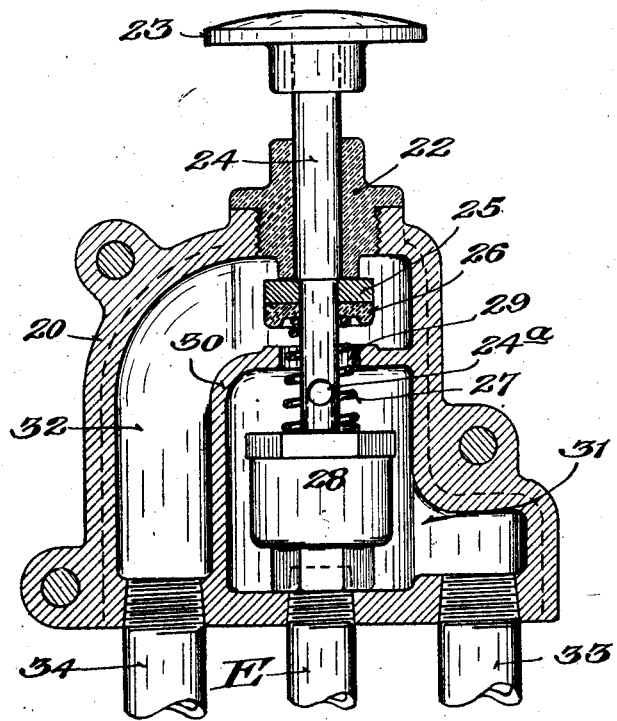
Figure 7 is a vertical sectional view of the valve shown in Figure 6.

With reference to the manner in which the fuel is elevated from the main storage tank C to the container 1 it will be observed that this operation is accomplished with the aid of compressed air supplied from a suitable source S through the line E to the valve device F which latter preferably includes in its organization a casing 20 having a detachable face plate 21 and provided at one side with a bushing 22 for receiving an operator's handle 23, the stem 24 of which preferably carries an abutment 25 and a cushion sealing-disk 26. The said stem 24 of the handle 23 is preferably maintained in its normal elevated position by a spring 27 confined between an air chuck 28 and the sealing disk 26, the lower end of said stem and surrounding spring 27 extending through an exhaust port 29 formed in the wall 30 of the casing. The said wall 30 divides the casing into the chambers 31 and 32, the said chamber 31 containing the air chuck 28 which connects directly with the pipe line E from the source of compressed air supply, and when the handle 23 is elevated communication between the chambers 31 and 32 is established through the port 29. As will be seen from Figure 7 the chamber 31 communicates with pipe 33 which leads to the top of the auxiliary fuel tank D shown in Figure 3, while the chamber 32 communicates with a vent pipe 34 which permits the escape of the compressed air from the chamber 31 and auxiliary tank as will presently appear.

The lower end of the stem 24 is provided with a longitudinal and laterally disposed opening bore which terminates in a lateral port 24ª, so that when the handle 23 is pushed downwardly the lower extremity of the stem 24 will open the air chuck 28 and permit air under pressure to escape from the port 24ª into the chamber 31, the sealing disk 26 on the stem 24 operating to close the port 29 between the chambers 31 and 32 thereby causing all of the air under pressure entering the chamber 31 to make its way into the pipe 33 and thence to the auxiliary supply tank D of the apparatus.

The said auxiliary supply tank D receives fuel from the main supply tank C through the connections 35 and 36, the former containing a check valve so that fuel flows by gravity from the main tank C to the auxiliary tank D. When the valve F is manipulated to permit air pressure to enter the auxiliary tank D the fuel in the tank is forced upwardly through the pipe section 36, through the valve element 37 and into the pipe line 38 which connects with the inlet pipe 9 by a suitable coupling as indicated at 39 in Figure 3.

When the operator removes hand-pressure from the handle 23 the spring 27 lifts the valve stem 24 and unseats the sealing disk 26 whereby pressure in the chamber 31 and line 33 will make its escape through the port 29 and into the chamber 32 and thus escape to the atmosphere through the vent line 34. Thus by the manipulation of a single valve it is possible to effect the elevation of the fuel from the storage tank to the dispensing container and automatically effect the release of air pressure trapped in the conduits or pipes leading to the fuel storage tanks.

When the fuel is elevated by manipulating the handle 23 of the valve F it will of course be understood that the fuel makes its way through the pipe 9 and passageway 8 of the base 2 into the fill pipe 10 where it unseats the valve 16 and passes downwardly into the chamber $x$ between the fill pipe 10 and the hollow standard 4 into the chamber 1ª of the base and thence into the container 1. As the chamber 1ª is in open communication with the space $y$ between the overflow pipe 13 and the hollow standard 5, the fuel will rise until the top of the collar 15 is reached whereupon the excess fuel will enter the overflow pipe 13 and make its way through the passage 11 in the base 2 and thence to the overflow pipe 12 leading back to the main storage tank C.

It will of course be understood that the hollow standards 4 do not have to be arranged in precisely the way shown in the accompanying drawings, but may be spaced farther away from the container 1 if desired, thereby to further conceal the inlet and outlet means for the container 1. It will also be understood that various changes in the form, proportion and minor details of construction may be resorted to without departing from the spirit of the invention or scope of the appended claims.

I claim:—

1. A liquid dispensing apparatus including a dispensing container, a tubular inlet member separate from but in open communication with the container, a vertical fill pipe within said tubular inlet member, and a valve device at the upper end of said tubular member, said valve device including a plug having an opening and secured to the tubular member, a boss formed on the plug around the opening therein and having a machined surface, and a shiftable valve member normally closing the end of the fill pipe and having a stem guided in said opening of the plug and adapted to establish communication between the atmosphere and the interior of the tubular member when the valve is seated on the upper end of the fill pipe, a boss formed on the valve surrounding the stem and also having a machined surface for abutting against the machined surface on the plug when the valve is raised.

2. A liquid dispensing apparatus including a dispensing container, a hollow base in open communication with the bottom of said dispensing container, said base having inlet and outlet chambers therein, separated therefrom and from one another, a pair of tubular members extending upwardly from said base and communicating at their lower ends therewith, a measuring container in open communication at its bottom with the interior of said base, an inlet tube in open communication at its lower end with one of said chambers and extending upwardly through one of said tubular members, an outlet tube in open communication at its lower end with the other of said chambers and extending upwardly into the other of said tubular members, dispensing means connected with the interior of said base, and inlet and outlet means connected with said inlet and outlet chambers, respectively.

In testimony whereof I hereunto affix my signature.

EDMOND P. HAYES.